United States Patent
Freymann

(10) Patent No.: US 6,834,503 B2
(45) Date of Patent: Dec. 28, 2004

(54) METHOD FOR THE OPERATION OF A STEAM THERMAL ENGINE, IN PARTICULAR AS A VEHICLE POWER UNIT

(75) Inventor: Raymond Freymann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 10/415,523

(22) PCT Filed: Oct. 19, 2001

(86) PCT No.: PCT/EP01/12122
§ 371 (c)(1),
(2), (4) Date: Apr. 30, 2003

(87) PCT Pub. No.: WO02/36938
PCT Pub. Date: May 10, 2002

(65) Prior Publication Data
US 2004/0045293 A1 Mar. 11, 2004

(30) Foreign Application Priority Data
Nov. 1, 2000 (DE) .......................... 100 54 022

(51) Int. Cl.[7] ................................. F01K 1/00
(52) U.S. Cl. .......................... 60/670; 60/676
(58) Field of Search ................... 60/670, 676

(56) References Cited

U.S. PATENT DOCUMENTS

| | | | |
|---|---|---|---|
| 3,930,367 A | * | 1/1976 | Gasparoli ............... 60/39.182 |
| 3,950,949 A | * | 4/1976 | Martin et al. ............ 60/641.8 |
| 4,031,705 A |   | 6/1977 | Berg |
| 4,300,353 A | * | 11/1981 | Ridgway .................... 60/618 |
| 4,393,653 A |   | 7/1983 | Fischer |
| 4,433,548 A |   | 2/1984 | Hallstrom, Jr. |
| 5,109,665 A | * | 5/1992 | Hoizumi et al. ......... 60/39.182 |
| 5,181,378 A |   | 1/1993 | Devine, Jr. |
| 5,603,218 A | * | 2/1997 | Hooper ...................... 60/655 |
| 5,950,418 A | * | 9/1999 | Lott et al. ............... 60/39.182 |
| 6,282,900 B1 | * | 9/2001 | Bell ........................... 60/648 |

FOREIGN PATENT DOCUMENTS

| | | |
|---|---|---|
| DE | 2116824 | 10/1972 |
| DE | 3630215 | 3/1987 |
| DE | 19610382 | 9/1997 |
| DE | 19847742 | 1/2000 |
| EP | 0076885 | 4/1983 |
| EP | 0902168 | 3/1999 |
| GB | 1554766 | 10/1979 |
| WO | 00/79104 | 12/2000 |

* cited by examiner

Primary Examiner—Hoang Nguyen
(74) Attorney, Agent, or Firm—Crowell & Moring LLP

(57) ABSTRACT

The invention relates to a method for the operation of a steam thermal engine, whereby the hot steam from a working medium is converted into kinetic energy, by means of a pressure-releasing device (1). The working medium is heated in a boiler (6) to a low temperature, preferably boiling point at a low pressure, steam is taken from the boiler (6) to a pressure chamber (7, 8), in which the steam is heated to a higher temperature. Liquid working medium (or condensate) is injected from the boiler (6) into the pressure chamber (7, 8) whereupon the working medium is instantaneously evaporated, such that the pressure in the pressure chamber (7, 8) rises markedly and the steam is fed from the pressure chamber (7, 8) to the pressure-releasing device (1).

22 Claims, 5 Drawing Sheets

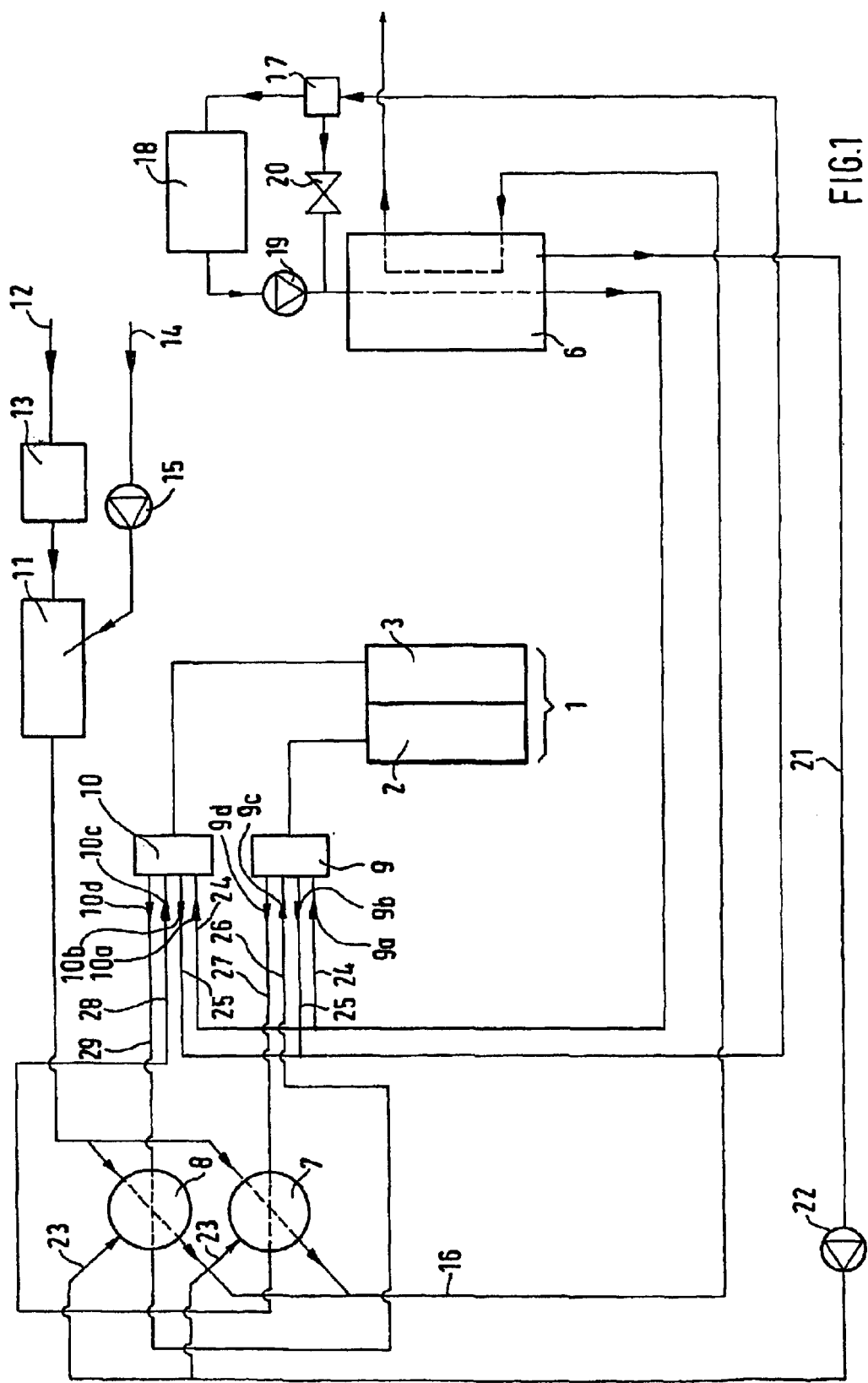

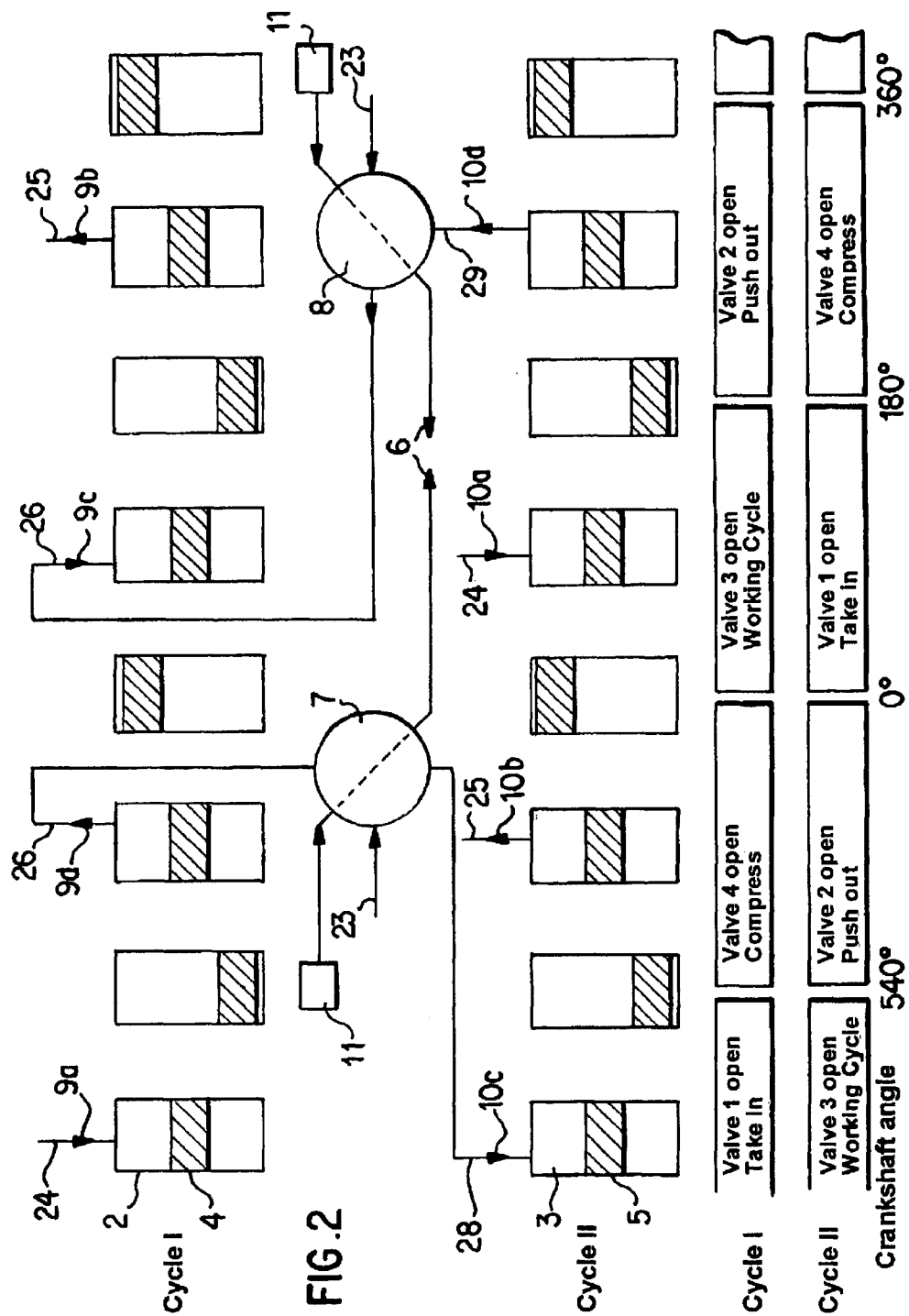

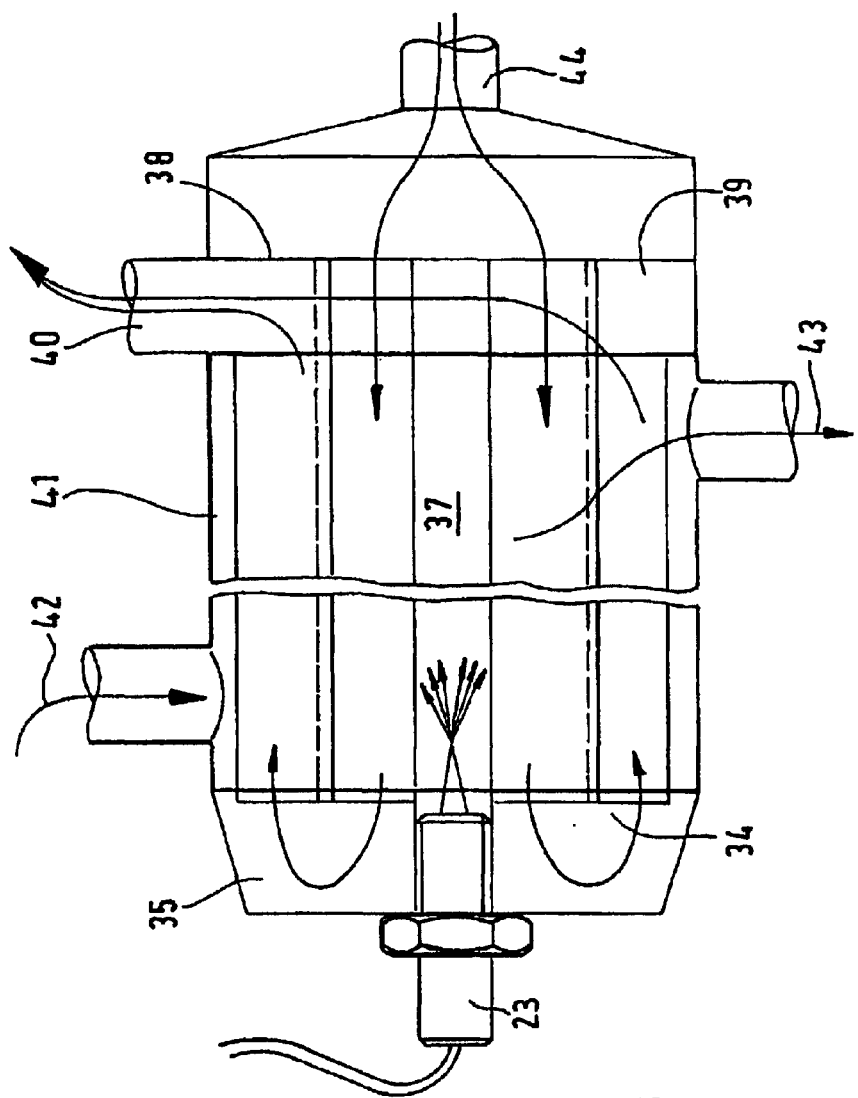
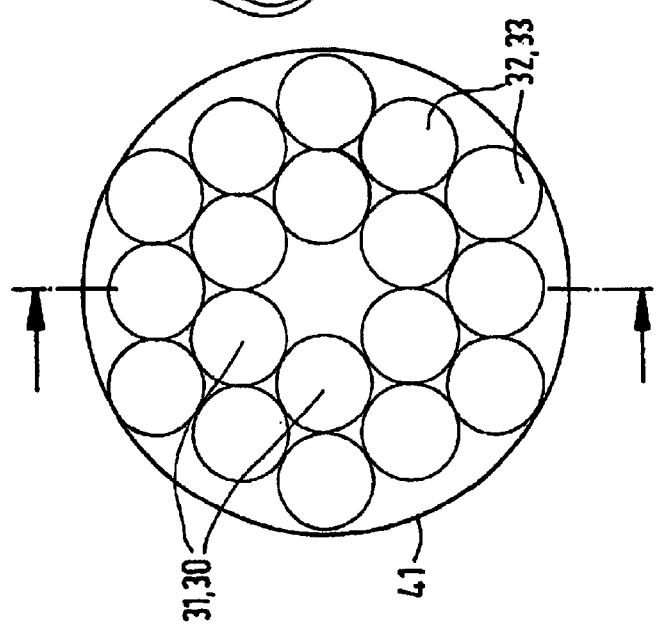
FIG.3b
FIG.3a

METHOD FOR THE OPERATION OF A STEAM THERMAL ENGINE, IN PARTICULAR AS A VEHICLE POWER UNIT

DESCRIPTION

The present invention relates to a process for operating a steam thermal engine and a device for operating a steam thermal engine. In particular, the invention relates to a steam engine, which can be operated with waste heat, especially from a burner or a combustion engine.

The DE 196 10 382 A1 discloses a steam engine, whose working medium is converted into superheated steam in an exhaust gas heat exchanger. The exhaust gas heat exchanger obtains its energy from the lost energy or from the waste heat of a combustion engine, which is coupled with the steam engine. To this end, the coolant and exhaust gas of the combustion engine pass through the exhaust gas heat exchanger.

Consequently, in this system an attempt is made to utilize the lost heat of a combustion engine in order to increase the total efficiency of the system. Under optimal operating conditions, one-third of the energy supplied in the form of fuel is converted into mechanical energy by a combustion engine, one-third is dissipated by way of the cooling water, and the other one-third is dissipated by way of the hot exhaust gas.

The use of the waste heat of a combustion engine is complex because there are two media as the transfer agents of the lost energy, which are the cooling water and the exhaust gas. The energy, present in both media, can be fed only inadequately to a single system for energy recovery or energy conversion, because their respective thermodynamic parameters are different. The temperature level of the cooling water is approximately 100° C. In contrast, the temperature of the exhaust gas is approximately 300° C. at operating points with a low load up to 900° C. at operating points with a high load.

If, for example, water is used as the medium in the circulation of the thermal engine, the result is a boiling temperature of 100° C. at a pressure of 1 bar. To realize a desired pressure level of 10 bar, however, a temperature of 180° C. is necessary. This eliminates the cooling water of the combustion engine as the energy supplier, because the cooling water temperature would have to reach a minimum of 200° C. to guarantee the requisite energy transfer by a heat exchanger.

Another problem is that the design of the entire system must be simple in order to achieve a low weight so that use in the automotive field is possible.

The present invention provides a solution to the problem by providing a thermal engine that enables a fast and efficient conversion of thermal energy, which is stored in media and has varying thermodynamic parameters, into mechanical energy.

According to the present invention, the thermal energy from the media with different thermodynamic parameters can be converted efficiently into a hot steam, which in turn can be converted efficiently into mechanical energy in the expansion unit, by taking the following steps: heating the working medium of a thermal engine in a boiler to a low temperature of preferably boiling temperature at low pressure; feeding steam from the boiler into a pressure vessel, in which the steam is heated to a high temperature; injecting the liquid working medium (or condensate) from the boiler into the pressure vessel, whereby the working medium is instantaneously evaporated, whereby the pressure in the pressure vessel increases rapidly; and by feeding the hot steam from the pressure vessel to an expansion unit.

Injecting the boiling working medium into the pressure vessel, which is heated with, for example, hot exhaust gas, and in which there is already a certain amount of hot steam, enables a spontaneous and enormously large pressure increase in the pressure vessel. The increase in pressure can be passed onto the expansion unit.

In this manner the boiler can be heated especially advantageously with the cooling water of a combustion engine and the pressure vessel can be heated with the exhaust gas stream of the combustion engine, whereby a high pressure level can be generated in the circulation of the thermal engine. Alternatively, the boiler is heated with the steam, which has already been expanded by the expansion unit, and the pressure vessel is heated by a burner.

In an especially advantageous design the steam from the boiler is pre-compressed and then fed to the pressure vessel, whereby both the pressure and the temperature of the steam in the pressure vessel increase before the liquid working medium is injected into the pressure vessel. In this manner the pressure level is also increased in the pressure vessel with the temperature increase.

In an especially advantageous design, not only the boiler is heated by the hot coolant of a combustion engine and/or by the steam, which has already been expanded in the expansion unit, and the pressure vessel is heated by the exhaust gas of the combustion engine, but also the exhaust gases are even used to heat the boiler, working on a low temperature level, after the pressure vessel has been heated up. Thus, the waste heat from a combustion engine can be used more completely for the expansion unit.

By coupling the shaft of a combustion engine, whose waste heat is recovered for the expansion unit, with the shaft of the expansion unit with a coupling and/or with a reduction gear, the expansion unit and the combustion engine can be joined together in a simple manner when adjusting the different speed levels or decoupled from each other.

In an especially advantageous design, at least two cylinders of a piston machine are provided with one allocated pressure vessel each as the expansion unit, whereby a reciprocating motion of the piston machine can be used to pre-compress the steam coming from the boiler; and a subsequent reciprocating motion of the piston can be used to expand the high pressure steam from the pressure vessel. In so doing, it is possible to allow the steam generating process in a pressure vessel and its expansion in one of the expansion units to take place alternatingly, for example, between the two cylinder units in such a manner that enough time remains for the respective steam conditioning in the respective pressure vessel.

Three preferred embodiments are described in detail below in the following with reference to the attached drawings.

BRIEF DESCRIPTION OF THE DRAWINGS

FIG. 1 is a schematic drawing of an inventive thermal engine, according to a first embodiment.

FIG. 2 is a schematic drawing, which shows the working cycle of the thermal engine, according to the first embodiment of FIG. 1.

FIG. 3a is a sectional view of the pressure vessel, according to the embodiment of FIG. 1.

FIG. 3b is a sectional view of the pressure vessel along the cutline A—A, according to FIG. 3a.

DETAILED DESCRIPTION OF THE DRAWINGS

Figure 4:
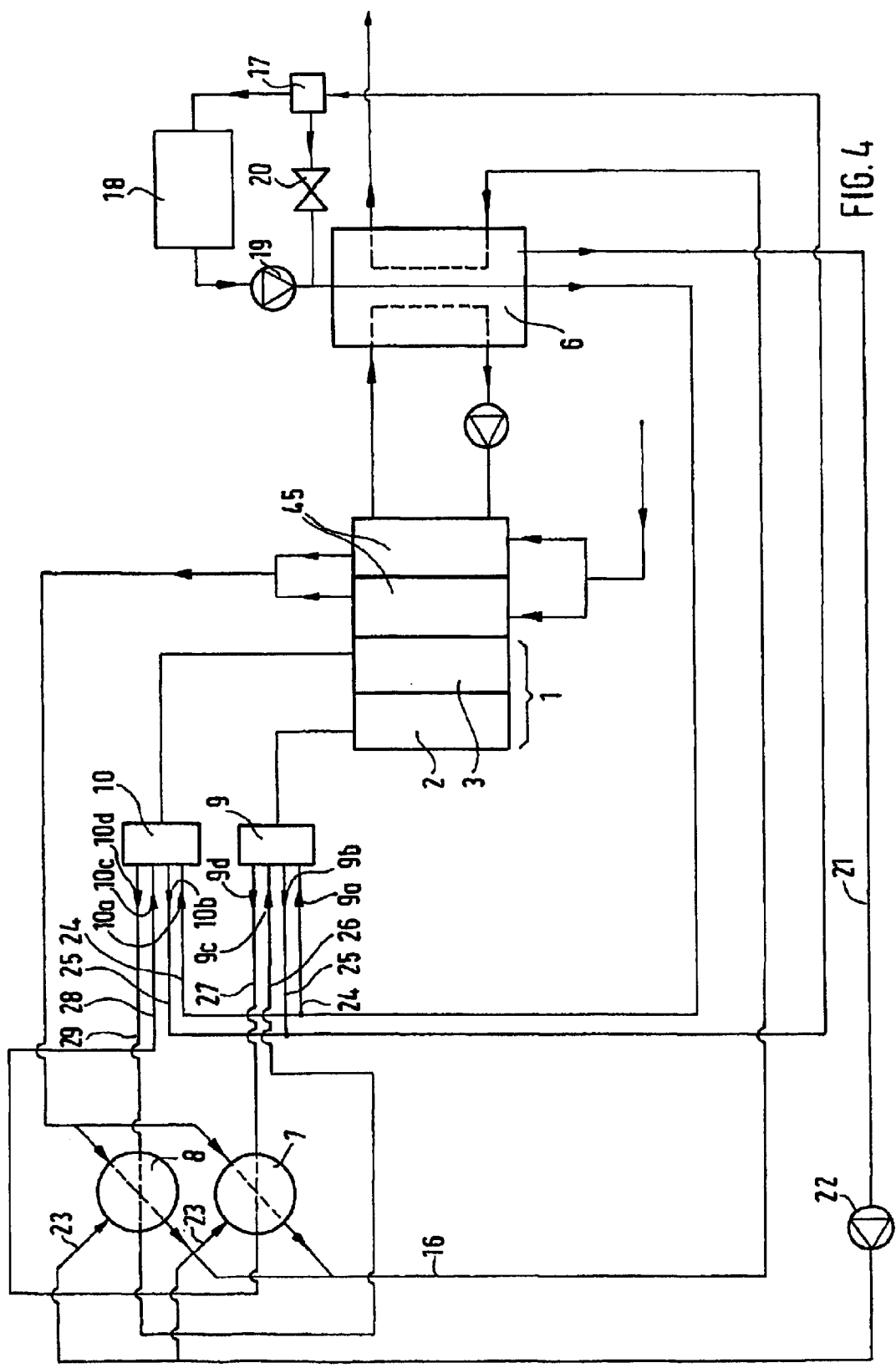
FIG. 4 is a schematic drawing of an inventive thermal engine, according to a second embodiment.

The construction and the operating mode of a first preferred embodiment of the thermal engine are explained with the aid of FIGS. 1 to 3.

According to FIG. 1, the thermal engine has an expansion unit 1 with a first cylinder 2 and a second cylinder 3, in which a piston 4 and 5 (shown as a schematic drawing in FIG. 2) is arranged so as to move reciprocally. Superheated steam, which is generated in a steam generator and belongs to a working medium that is preferably water here, is expanded in the cylinders 1 and 2, in order to deliver mechanical energy to a shaft (not illustrated) by way of the pistons 4 and 5 that move back and forth.

The steam generator has a boiler 6, which is designed as a heat exchanger and in which the working medium is heated preferably to boiling temperature, preferably to approximately 80 to 130° C. at 1 to 3 bar. The steam generator further includes first and second pressure vessels 7, 8, which are designed as a heat exchanger and in which superheated steam, that is the vaporous phase of the working medium, is generated at a temperature of preferably 300° C. to 600° C., at a pressure ranging from 6 to 18 bar.

The first and the second pressure vessel 7, 8 are assigned first and second valve units 9, 10 respectively. Each valve unit 9, 10 has first 9a, 10a; second 9b, 10b; third 9c, 10c; and fourth valves 9d, 10d.

The pressure vessels 7, 8 are heated with hot exhaust gas and a burner 11. The burner 11 is supplied, on the one hand, by an air line 12 and a fan 13, with ambient air and/or oxygen and, on the other hand, by a fuel line 14 and a pump 15 with fuel (gasoline, diesel gas, etc.). After the exhaust gas from the burner has dissipated the bulk of its quantity of heat for producing steam in the pressure vessel, the exhaust gas arrives, after passing through the pressure vessels 7, 8, by way of a line 16 into the boiler 6, in order to heat the water, which is present there in the liquid and partially vaporous state, whereby the residual heat from the exhaust gas is further utilized. The expanded steam is fed by way of a valve block 17 to a condenser 18, where the steam is further liquefied. The condensate is fed by a pump 19 to the boiler 6. The valve block 17 can be switched in such a manner that the expanded steam, coming from the expansion unit 1, is passed directly by the throttle 20, bypassing the condenser 18, into the boiler 6. The valve block 17 controls the further passage of the expanded steam either to the condenser 18 or to the boiler 6 as a function of the temperature and/or the liquid state in the boiler 6.

Boiling working medium from the boiler 6 is injected by way of a line 21 and a high pressure pump 22 and an injection nozzle 23 into the pressure vessel 7, 8.

The first 9 and the second valve unit 10 is designed preferably as an integral part in the cylinder head (not illustrated) of the respectively assigned first and second cylinder 2, 3. The four valves 9a to 9d, 10a to 10d of a valve unit 9, 10 are preferably conventional mushroom-shaped valves, as also used in a four valve combustion engine. However, any type of channel opening and closing unit, such as a rotary disk valve unit or sliding valve unit, can be used as the valves 9a to 9d, 10a to 10d. The valve is controlled mechanically, for example, by a camshaft or electrically by controlled electromagnets or pneumatically or hydraulically by corresponding actuators or by any other appropriate actuating unit.

The first valve 9a, 10a of each valve unit 9, 10 is connected to the boiler 6 by a line 24. The second valve 9b, 10b of each valve unit 9, 10 is connected to the valve block 17 or the condenser 18 and/or the boiler 6 by a line 25. The third valve 9c of the first valve unit 9 is connected to the second pressure vessel 8 by a line 26. A fourth valve 9d of the first valve unit 9 is connected to the first pressure vessel 7 by a line 27. A third valve 10c of the second valve unit 10 is connected to the first pressure vessel 7 by a line 28. A fourth valve 10d of the second valve unit 10 is connected to the second pressure vessel 8 by a line 29.

The operating mode of the thermal engine with its two cylinders 2, 3 and its assigned pressure vessels 7, 8 is explained in detail below with reference to FIG. 2.

First, the operating sequence of the first cylinder 2 is described:

Cycle 1: Take in steam by way of the first valve 9a of the first valve block 9 from the boiler 6 with the piston 4, which travels starting from the upper dead center in the downward direction and belongs to the first cylinder 2. In the case of the water vapor used in the embodiment, the typical thermodynamic parameters are t=100° C., p=2 bar. The first valve 9a is opened during a crank angle of approximately 180°.

Cycle 2: Compress the water vapor by the piston 4, which travels starting from the bottom dead center toward the top and belongs to the first cylinder 2. And withdraw the compressed steam by way of the fourth valve 9d of the first valve block 9 and the line 27 into the first pressure vessel 7. The fourth valve 9d of the first valve block 9 is opened during the compression phase lasting at a crank angle of approximately 180°.

After closing the line 27, heated liquid working medium (at a preferred temperature of t=100° C.) which is supplied from the boiler 6 by way of the line 21, the high pressure pump 22 and the injection valve 23, is injected into the first pressure vessel 7. Owing to the high temperature, prevailing in the pressure vessel 7, this water can be used instantaneously for evaporation, whereby the pressure in the pressure vessel 7 is significantly increased, typically to 6–18 bar.

Cycle 3: The third valve 9c of the first valve block 9 is opened and passes the superheated steam, which is already conditioned in the second pressure vessel 8 and ranges from typically 6 to 18 bar, into the first cylinder 2, whose piston 4 is still located in the upper dead center, in order to expand the hot steam, located in the second pressure vessel 8. The resulting mechanical work is delivered to the crankshaft (not illustrated).

Cycle 4: When the piston 4 of the first cylinder 2 arrives at the bottom dead center, the fourth valve 9b of the first valve block 9 is opened; and the expanded steam is fed to the boiler 6 either by way of the condenser 18 and the pump 19 or directly by way of the throttle 20 over the piston 4, which moves again toward the top, over the line 25, the valve block 17.

These working cycles run analogously in the second cylinder 3, whereby the first pressure vessel 7, precompressed by the first cylinder 2, is expanded by the second cylinder 3. The two cylinders 2 and 3 work offset in time in such a manner, that following injection of the boiling water or the working medium into the respective pressure vessel 7, 8, there exists the maximum time for conditioning the pressure.

Respectively while the first cylinder 2 takes in steam from the boiler, and feeds to the second pressure vessel 8 in the pre-compressed form, the second cylinder 3 expands the superheated steam from the first pressure vessel 7 and produces mechanical work and vice versa, so that the result is a dwell time of the steam in the pressure vessel 7, 8 of 180° crankshaft angle. The dwell time can be used to evaporate the liquid working medium, injected into the pressure vessel 7, 8, from the boiler 6.

FIGS. 3a and 3b show in detail the pressure vessel 7, which has tubes 30, which are arranged in an inner ring 31, and other tubes 32, which are arranged in an outer ring 33 around the inner ring 31. The face side 34 of the inner ring 31 of tubes 30 is connected to the outer ring 33 of tubes 32 by an overflow chamber 35. On the one face side 34 of the pressure vessel 7 there is centered an injection unit 36, whose purpose is to inject liquid working medium and which injects the liquid working medium into the space 37, surrounded by the inner ring 31. The other face side 38 exhibits an exhaust gas inlet 44, which is open in the direction to the tubes 30 of the inner ring 31. On the same face side 38 there is a collecting chamber 39 around the end side of the tubes 32 of the outer ring 33, said chamber being provided with an exhaust gas outlet 40. The entire construction is enveloped by a pressure-proof jacket 41, which is provided with a steam inlet 42 and a steam outlet 43.

Hot gases flow over the exhaust gas inlet 44 into the tubes 30 of the inner ring 31 and flow to the opposite face side 34 into the tubes 32 of the outer ring 33 over the overflow chamber 35, through the tubes 32 of the outer ring 33 and exit again by way of the collecting chamber 39 and the exhaust gas outlet 40 from the pressure vessel 7, 8. Preferably pre-compressed steam is supplied at the steam inlet 42. Liquid, but boiling working medium, for example water, is injected by the injection nozzle 23. The injected working medium evaporates instantaneously due to the high temperature in the pressure vessel 7, 8, and mixes with the pre-compressed steam. After a predetermined dwell period, which guarantees that steam was formed at the desired temperature and the desired pressure in an adequate quantity, the steam is fed by the steam outlet 43 to the expansion unit 1.

FIG. 4 shows a second embodiment, which differs from the first embodiment, according to FIGS. 1 to 3, only in that, instead of the burner 11, there is a combustion engine 45, which is coupled directly to the expansion unit 1, or by way of a coupling (not illustrated) and/or a gear (not illustrated). The cooling water of the combustion engine 45 is fed to the boiler 6, in order to heat it, whereby the hot exhaust gas of the combustion engine 45 is fed to the pressure vessels 7, 8, in order to heat them to the desired high temperature.

Figure 5:
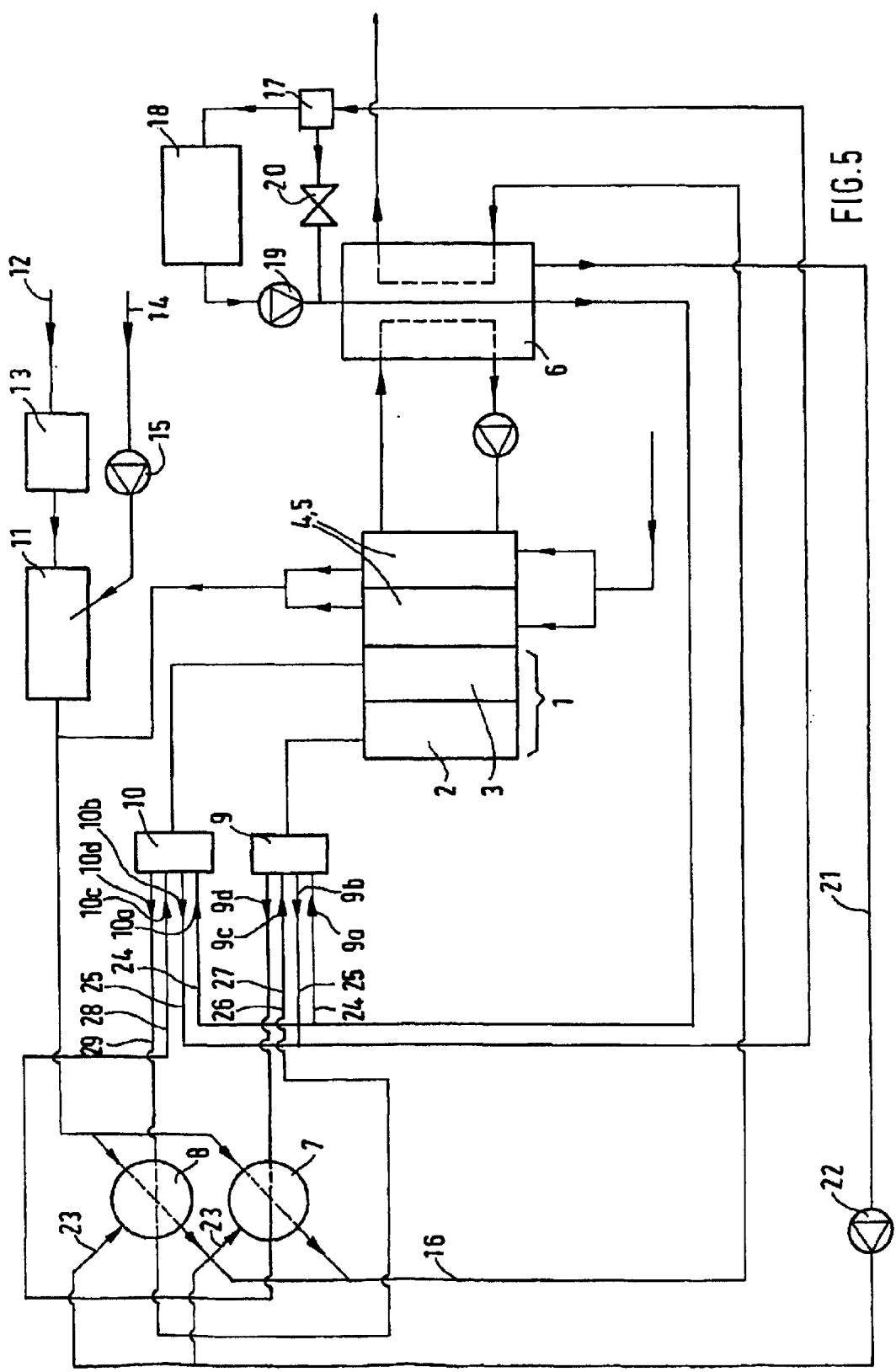
FIG. 5 is a schematic drawing of an inventive thermal engine, according to a third embodiment.

FIG. 5 shows a third embodiment, which is a combination of the first embodiment, according to FIGS. 1 to 3, and the second embodiment, according to FIG. 4. That is, that the thermal engine, according to the third embodiment, has both a burner 11 and a combustion engine 45. The burner 11 is switched on, as necessary. This is especially the case during the warm up period of the combustion engine 45, or when maximum power is required.

In the second (FIG. 4) and third embodiment (FIG. 5) the combustion engine 45 can be turned off in the event of a low load, or if the thermal engine is used in a vehicle, in overrun condition, whereby the thermal energy, stored in the pressure vessel 7, 8, can still be used to operate the expansion unit 1.

The above described embodiments can be provided with the following modifications.

Both the expansion unit 1 and the combustion engine 45 can also be designed, instead of as a piston machine, as a rotary piston machine, according to the Wankel principle, or as a turbine.

As the working medium, water or also any other appropriate working medium, such as hydrocarbons, can be used that have at normal pressure of 1 bar, an evaporation temperature ranging from 70° C. to 110° C. and a freezing point of below −40° C.

When coupling the steam thermal engine with a liquid cooled combustion engine it is advantageous for the dissipation of heat from the engine coolant into the boiler to design the combustion engine with cooling with performance data.

For the pressure vessel 7, 8 as the second heat exchanger at a relatively high temperature level, the external waste heat can also or additionally be supplied by a fuel cell, in particular of the SOFC type.

What is claimed is:

1. A process for operating a steam thermal engine, comprising:
   heating a liquid working medium to a low temperature at a low pressure in a first heat exchanger using external waste heat of relatively low energy, to form a wet steam;
   heating the wet steam to a relatively high temperature by feeding the wet steam to a second heat exchanger heated by external waste heat of relatively high energy;
   injecting liquid working medium or condensate of relatively low boiling temperature from the first heat exchanger into steam atmosphere of the second heat exchanger to produce a hot steam, which is used to perform work in an expansion unit of the thermal engine, with an instantaneous evaporation of the working medium of approximately boiling temperature with a significant increase in pressure;
   feeding the hot steam back into the first heat exchanger as condensate after the hot steam has performed the work; and
   pre-compressing the steam from the first heat exchanger and feeding the steam to the second heat exchanger, whereby both the pressure and the temperature of the steam in the second heat exchanger increase before the liquid working medium is injected into the second heat exchanger.

2. The process of claim 1, wherein the temperature level of the working medium in the boiler ranges from 80° C. to 130° C. at a pressure ranging from 1 bar to 3 bar, wherein the steam from the first heat exchanger rises to a pressure ranging from 3 to 9 bar due to the precompression and further passage into the second heat exchanger, causing the temperature in the second heat exchanger to rise, and wherein the pressure in the second heat exchanger rises to 6 to 18 bar due to the injection of the liquid working medium.

3. The process of claim 2, further comprising:
   heating the first heat exchanger with hot coolant from a combustion engine;
   heating the second heat exchanger with the exhaust gas of the combustion engine; and
   after heating up the second heat exchanger, using the exhaust gas to heat the first heat exchanger.

4. A process for operating a steam thermal engine, comprising:
   heating a liquid working medium to a low temperature at a low pressure in a first heat exchanger using external waste heat of relatively low energy, to form a wet steam;

heating the wet steam to a relatively high temperature by feeding the wet steam to a second heat exchanger heated by external waste heat of relatively high energy;

injecting liquid working medium or condensate of relatively low boiling temperature from the first heat exchanger into steam atmosphere of the second heat exchanger to produce a hot steam, which is used to perform work in an expansion unit of the thermal engine, with an instantaneous evaporation of the working medium of approximately boiling temperature with a significant increase in pressure;

feeding the hot steam back into the first heat exchanger as condensate after the hot steam has performed the work;

wherein the external waste heat of relatively low energy is hot coolant from a combustion engine;

wherein the external waste heat of relatively high energy is the exhaust gas of the combustion engine; and after heating up the second heat exchanger, using the exhaust gas to heat the first heat exchanger.

5. The process of claim 3, wherein the expansion unit includes a piston machine having at least first and second cylinders, whereby the first cylinder includes a first pressure vessel and a first valve unit having first to fourth valves, and the second cylinder includes a second pressure vessel and a second valve unit having first to fourth valves.

6. A process for operating a steam thermal engine, comprising:

heating a liquid working medium to a low temperature at a low pressure in a first heat exchanger using external waste heat of relatively low energy, to form a wet steam;

heating the wet steam to a relatively high temperature by feeding the wet steam to a second heat exchanger heated by external waste heat of relatively high energy;

injecting liquid working medium or condensate of relatively low boiling temperature from the first heat exchanger into steam atmosphere of the second heat exchanger to produce a hot steam, which is used to perform work in an expansion unit of the thermal engine, with an instantaneous evaporation of the working medium of approximately boiling temperature with a significant increase in pressure; and feeding the hot steam back into the first heat exchanger as condensate after the hot steam has performed the work, wherein the expansion unit includes a piston machine having at least first and second cylinders, whereby the first cylinder includes a first pressure vessel and a first valve unit having first to fourth valves, and the second cylinder includes a second pressure vessel and a second valve unit having first to fourth valves.

7. The process of claim 6, further comprising, in a first cycle of the first cylinder, feeding steam into the first heat exchanger over a first line and the first valve of the first valve unit;

in a second cycle, compressing the steam in the first cylinder and feeding the steam to the first pressure vessel via the fourth valve of the first valve unit and a second line;

injecting the liquid working medium from the first heat exchanger into the first pressure vessel to develop steam;

feeding the developed steam over a third line and the third valve of the second valve unit to the second cylinder for expansion;

feeding the expanded steam from the second cylinder to a condenser via the second valve of the second valve unit; and feeding the condensate from the condenser through a pump to the first heat exchanger.

8. The process of claim 7, wherein the two cylinders work offset in time in such a manner that after the injection of the boiling working medium into the second heat exchanger, there exists the maximum time for conditioning the pressure in this second heat exchanger.

9. The process of claim 6, wherein the two cylinders work offset in time in such a manner that after the injection of the boiling working medium into the second heat exchanger, there exists the maximum time for conditioning the pressure in this second heat exchanger.

10. The process of claim 4, wherein the first heat exchanger includes a boiler.

11. The process of claim 10, wherein the second heat exchanger includes a pressure vessel.

12. The process of claim 4, wherein the second heat exchanger includes a pressure vessel.

13. A device for carrying out the process of claim 11, comprising the boiler, the pressure vessel, an expansion unit, connecting lines and valves.

14. The device of claim 13, wherein in the pressure vessel, exhaust gas from a combustion engine produces steam for an expansion unit.

15. The device of claim 14, wherein the expansion unit and the combustion engine are designed as a piston machine or as a rotary piston machine or as a turbine.

16. A device comprising:

a first heat exchanger for heating a liquid working medium to a low temperature at a low pressure using external waste heat of relatively low energy to form a wet steam;

a second heat exchanger for heating the wet steam to a relatively high temperature by feeding the wet steam using external waste heat of relatively high energy, the second heat exchanger being connected to the first heat exchanger, wherein liquid working medium or condensate of relatively low boiling temperature from the first heat exchanger can be injected into steam atmosphere of the second heat exchanger to produce a hot steam with an instantaneous evaporation of the working medium of approximately boiling temperature with a significant increase in pressure; and an expansion unit of a thermal engine, where the hot steam can be used to perform work, wherein the expansion unit is connected to the first heat exchanger so that the hot steam can be fed back into the first heat exchanger as condensate after the hot steam has performed the work, wherein the first heat exchanger is connected with a coolant circuit of a combustion engine for feeding hot coolant from the combustion engine to the first heat exchanger and the external waste heat of relatively low energy is the hot coolant from the combustion engine and wherein the second heat exchanger is connected with an exhaust system of the combustion engine for feeding exhaust gas of the combustion engine to the second heat exchanger and the external waste heat of relatively high energy is the exhaust gas of the combustion engine.

17. A device comprising:

a first heat exchanger for heating a liquid working medium to a low temperature at a low pressure using external waste heat of relatively low energy to form a wet steam;

a second heat exchanger for heating the wet steam to a relatively high temperature by feeding the wet steam using external waste heat of relatively high energy, the second heat exchanger being connected to the first heat exchanger, wherein liquid working medium or condensate of relatively low boiling temperature from the first heat exchanger can be injected into steam atmosphere of the second heat exchanger to produce a hot steam with an instantaneous evaporation of the working medium of approximately boiling temperature with a significant increase in pressure; and an expansion unit of a thermal engine, where the hot steam can be used to perform work, wherein the expansion unit is connected to the first heat exchanger so that the hot steam can be fed back into the first heat exchanger as condensate after the hot steam has performed the work, wherein the expansion unit includes a piston machine having at least first and second cylinders, whereby the first cylinder includes a first pressure vessel and a first valve unit having first to fourth valves, and the second cylinder includes a second pressure vessel and a second valve unit having first to fourth valves.

18. The device of claim 16, wherein the first heat exchanger includes a boiler.

19. The device of claim 18, wherein the second heat exchanger includes a pressure vessel.

20. The device of claim 16, wherein the second heat exchanger includes a pressure vessel.

21. The process of claim 4, wherein the low temperature is the boiling temperature of the liquid working medium.

22. The device of claim 16, wherein the low temperature is the boiling temperature of the liquid working medium.

* * * * *